(12) United States Patent
Bendani et al.

(10) Patent No.: US 10,807,476 B2
(45) Date of Patent: Oct. 20, 2020

(54) ELECTRICAL SYSTEM FOR CHARGING A HIGH-VOLTAGE BATTERY AND A LOW-VOLTAGE BATTERY

(71) Applicant: Valeo Siemens eAutomotive France SAS, Cergy (FR)

(72) Inventors: Larbi Bendani, Meru (FR); Reda Chelghoum, Carrieres-sur-Seine (FR); Benedicte Silvestre, Vaux-sur-Seine (FR); Bruno Condamin, Pontoise (FR); Mimoun Askeur, Vaureal (FR); Massourang Diallo, Epinay-sur-Seine (FR)

(73) Assignee: Valeo Siemens eAutomotive France SAS, Cergy (FR)

( * ) Notice: Subject to any disclaimer, the term of this patent is extended or adjusted under 35 U.S.C. 154(b) by 0 days.

(21) Appl. No.: 15/980,104

(22) Filed: May 15, 2018

(65) Prior Publication Data

US 2018/0334045 A1    Nov. 22, 2018

(30) Foreign Application Priority Data

May 19, 2017  (FR) ...................... 17 54440

(51) Int. Cl.
*H02J 7/00* (2006.01)
*B60L 11/18* (2006.01)
(Continued)

(52) U.S. Cl.
CPC ........... *B60L 11/1812* (2013.01); *B60L 53/22* (2019.02); *B60L 58/20* (2019.02); *H02J 7/022* (2013.01);
(Continued)

(58) Field of Classification Search
CPC .................................................. B60L 2210/12
(Continued)

(56) References Cited

U.S. PATENT DOCUMENTS

2010/0097031 A1* 4/2010 King ..................... H02J 7/0045
320/109
2012/0112702 A1* 5/2012 Steigerwald .......... B60L 3/0069
320/137
(Continued)

FOREIGN PATENT DOCUMENTS

FR   3036864 A1   12/2016
KR   20150006530 A   1/2015
(Continued)

OTHER PUBLICATIONS

French Search Report.

*Primary Examiner* — Yalkew Fantu
(74) *Attorney, Agent, or Firm* — JCIP; Joseph G. Chu; Jeremy I. Maynard

(57) ABSTRACT

The present invention pertains to an electrical system, in particular designed to be installed on board an electric or hybrid vehicle, whereby said electrical system includes an AC-to-DC converter that includes a rectifier and a DC-to-DC converter, an isolated DC-to-DC converter connected to a high voltage battery, and whereby said electrical system is configured, in a first operating mode, to be connected to an external alternating electricity grid to charge the high voltage battery. Furthermore, the first interface terminals of the DC-to-DC converter are connected to a low voltage battery, whereby said electrical system is configured so that, in a second operating mode, when the electrical system is disconnected from the external alternating electricity grid, said DC-to-DC converter supplies an initial voltage from the high voltage battery to power the low voltage battery.

10 Claims, 3 Drawing Sheets

(51) Int. Cl.
*H02J 7/02* (2016.01)
*B60L 53/22* (2019.01)
*B60L 58/20* (2019.01)
H02M 3/335 (2006.01)
H02M 7/06 (2006.01)
H02M 3/156 (2006.01)

(52) U.S. Cl.
CPC ....... *B60L 2210/12* (2013.01); *B60L 2210/14* (2013.01); *B60L 2210/30* (2013.01); *H02M 3/156* (2013.01); *H02M 3/33569* (2013.01); *H02M 7/06* (2013.01)

(58) Field of Classification Search
USPC .......................................................... 320/109
See application file for complete search history.

(56) References Cited

U.S. PATENT DOCUMENTS

| | | | |
|---|---|---|---|
| 2014/0265560 A1* | 9/2014 | Leehey | ................... B60L 58/13 |
| | | | 307/10.1 |
| 2015/0183328 A1* | 7/2015 | Kusch | ..................... B60L 58/26 |
| | | | 320/109 |
| 2015/0280593 A1* | 10/2015 | Ando | ....................... H02M 1/42 |
| | | | 363/17 |
| 2019/0100111 A1* | 4/2019 | Liu | ......................... B60L 50/50 |

FOREIGN PATENT DOCUMENTS

| | | | |
|---|---|---|---|
| WO | 2014112925 A1 | 7/2014 | |
| WO | 2017064220 A1 | 4/2017 | |

\* cited by examiner

ELECTRICAL SYSTEM FOR CHARGING A HIGH-VOLTAGE BATTERY AND A LOW-VOLTAGE BATTERY

RELATED APPLICATION

This application claims priority to, and the benefit of, French Patent Application No. FR 1754440 with the filing date of May 19, 2017, the content of which is incorporated by reference in its entirety herein.

TECHNICAL FIELD

Broadly speaking, the invention pertains to the field of automotive vehicles, in particular electric or hybrid vehicles, and concerns, more particularly, a management system for the low voltage and high voltage battery charge of such vehicles.

More specifically, in the context of an electric or hybrid vehicle that features a low voltage battery to power the vehicle's equipment, and a high voltage battery, participating in the vehicle's propulsion, it is common practice to implement an on-board charger system, generally described by its acronym OBC, which is a feature that is well known to the person skilled in the art. In this context, the present invention pertains to an electrical system that forms an improved on-board charger.

BACKGROUND

As is well known, an electric or hybrid vehicle includes an electric drive system powered by a high voltage battery through an on-board high voltage electrical system and multiple auxiliary electrical installations, which are powered by a low voltage battery through an on-board low voltage electrical system. The high voltage battery powers the electric drive system, thereby providing for the vehicle's propulsion. The low voltage battery powers the auxiliary electrical installations, such as the on-board computers, the window lift motors, the multimedia system, etc. The high voltage battery typically provides from 100 V to 900 V, preferentially from 100 V to 500 V, whereas the low voltage battery typically delivers 12 V, 24 V or 48 V. Said high and low voltage batteries must be chargeable.

The electrical power charging of the high voltage battery is achieved by connecting the battery, through the high voltage electrical system of the vehicle, to an external electricity grid, for example the domestic alternating electricity grid.

For this purpose, the high voltage battery is therefore designed to be connected to, and charged by the domestic alternating electricity grid, through an on-board charger system, or OBC, which primarily features an AC-to-DC converter that includes a rectifier and a DC-to-DC converter with Power Factor Correction (or PFC), and a DC-to-DC converter, preferentially galvanically isolated.

In this type of OBC system, as shown in FIG. 1, the alternating current from the domestic alternating electricity grid G1 is initially processed in an AC-to-DC converter, whereby it is converted into direct current by the rectifier RD, before being supplied to the PFC converter (PFC1).

The purpose of the PFC converter, in its power factor corrective function, it to eliminate distortions of the power grid affecting the absorbed current in order to prevent harmonic currents from being generated, as these are detrimental to the on-board electrical system, and in particular to the high voltage electrical system. The PFC converter is used to ensure that the input current and voltage are in phase.

It is also well known that the high voltage battery can be used to charge the low voltage battery. In this case, the high voltage battery is connected to the low voltage battery with a pre-regulator and an auxiliary DC-to-DC converter, where said auxiliary DC-to-DC converter is galvanically isolated. The low voltage supplied by the auxiliary DC-to-DC converter therefore powers the low voltage electrical system of the vehicle.

Currently, there are separate charging functions for the high voltage battery and the low voltage battery, and each function requires the implementation of respectively dedicated DC-to-DC converters and pre-regulators.

For the purpose of improving the compactness of OBC systems and limiting the number of required components, one idea is to combine the functions of the on-board charger system.

According to the state of the art, it is well known to arrange the components of the OBC systems, respectively dedicated to charging the high voltage battery and the low voltage battery, in the same casing. It is also well known to arrange both battery charging systems so that they share the same cooling system, the same filters, and even the same command electronic controller.

Document WO 2015/192133 describes an example of an OBC system for an electric or hybrid vehicle. The OBC system described in document WO 2015/192133 is galvanically isolated and the PFC converter it includes is configured to maximise the supplied power density through a combination of resonant elements and magnetic components.

This document is representative of the state of the art, and the described OBC system features the abovementioned disadvantages, in particular in terms of the space it uses.

To mitigate these disadvantages, the present invention proposes to use the PFC converter of the AC-to-DC converter, whereby the alternating current from the domestic alternating electricity grid is convert into direct voltage for the high voltage electrical system, both during the charging of the high voltage battery and during the charging of the low voltage battery, i.e. not at any time when the high voltage battery is being charged.

Consequently, according to the invention, the PFC converter serves as a standard PFC converter that regulates the output voltage, from the voltage coming from the rectified external alternating electricity grid, in view of charging the high voltage battery when it is charging, and providing a pre-regulation function for the auxiliary DC-to-DC converter that powers the low voltage battery when the high voltage battery is not charging.

SUMMARY

Specifically, the invention pertains to an electrical system, in particular designed to be installed on board an electric or hybrid vehicle, whereby said electrical system includes
an AC-to-DC converter that includes a rectifier and a DC-to-DC converter,
an isolated DC-to-DC converter connected to a high voltage battery, and
whereby said electrical system is configured, in a first operating mode, to be connected to an external alternating electricity grid to charge the high voltage battery, whereby said rectifier supplies a rectified voltage to the DC-to-DC converter from the alternating current received from the external alternating electricity grid, and whereby said DCto-DC converter is connected to the high voltage battery through the isolated DC-to-DC converter.

Said electrical system is wherein: the first interface terminals of the DC-to-DC converter are designed to be connected to a low voltage battery, and in that said electrical system is configured so that, in a second operating mode, when the electrical system is disconnected from the external alternating electricity grid, said DC-to-DC converter supplies an initial voltage from the high voltage battery to power the low voltage battery.

With the electrical system according to the invention, the OBC system features improved compactness, since the DC-to-DC converter fulfils two functions, which removes the need of having a pre-regulator dedicated to charging the low voltage battery.

Furthermore, in a second operating mode, the DC-to-DC converter has the advantage of being able to deliver, for the purpose of charging the low voltage battery, an initial direct voltage without current discontinuity.

In one embodiment, said electrical system also includes: an auxiliary DC-to-DC converter connected to the low voltage battery, and featuring one input connected to the first interface terminals of the DC-to-DC converter, and where said electrical system is configured so that, in a second operating mode, said DC-to-DC converter provides the auxiliary DC-to-DC converter with the initial voltage from the high voltage battery for the purpose of powering the low voltage battery.

Advantageously, the DC-to-DC converter and the auxiliary DC-to-DC converter respectively include switches configured to control the electrical power supplied respectively by said DC-to-DC converter and by said auxiliary DC-to-DC converter. Therefore, in the second operating mode, the switches of the auxiliary DC-to-DC converter work on a constant duty cycle, and the switches of the DC-to-DC converter work on a variable duty cycle, so as to control the voltage supplied by the auxiliary DC-to-DC converter to the low voltage battery.

In one embodiment, the electrical system includes a first switch connected between a high input terminal of the high voltage battery and a second high interface terminal of the DC-to-DC converter, and a second switch connected between a low input terminal of the low voltage battery and a low second interface terminal of the DC-to-DC converter, and said electrical system is configured so that, in the second operating mode, the first and second switches are closed, thereby ensuring that a third high voltage, at the terminals of the high voltage battery, is imposed on the second interface terminals of the DC-to-DC converter.

Advantageously, the first interface terminals of the DC-to-DC converter correspond to the terminals connected at the input of the isolated DC-to-DC converter, and the second interface terminals of the DC-to-DC converter correspond to the terminals connected at the output of the rectifier.

Advantageously, in the first operating mode, the auxiliary DC-to-DC converter is also configured to convert the voltage supplied by the DC-to-DC converter from the external alternating electricity grid to a voltage that can be used to power the low voltage battery.

Advantageously, the first interface terminals of the DC-to-DC converter correspond with the terminals connected at the output of the rectifier, and the second interface terminals of the DC-to-DC converter correspond with the terminals connected at the input of the isolated DC-to-DC converter.

Advantageously, in the first operating mode, the first and second switches are open, so as to enable the DC-to-DC converter to provide voltage to the high voltage battery through said isolated DC-to-DC converter.

In one embodiment, the first and second switches are electromechanical relays or semiconductor switches.

In the chosen embodiment, the DC-to-DC converter is of the boost type, or of the buck-boost type.

In one embodiment, the electrical system includes filtering means connected to the input of the rectifier, used to filter the voltage supplied by the external alternating electricity grid and to supply filtered voltage to the rectifier.

In one embodiment, the switches of the DC-to-DC converter are configured so that, in a first operating mode, the DC-to-DC converter delivers an initial voltage based on the voltage demand of the high voltage battery.

In one embodiment, the switches of the DC-to-DC converter are configured so that, in a second operating mode, the DC-to-DC converter delivers an initial voltage based on the voltage demand of the low voltage battery.

In one embodiment, the electrical system includes the means to determine the voltage demand of the low voltage battery.

In one embodiment, the electrical system also includes the means to determine the voltage demand of the high voltage battery.

BRIEF DESCRIPTION OF THE DRAWINGS

The invention is better understood upon reading the following description, provided as an example, and with reference to the appended figures, which represent.

DETAILED DESCRIPTION

It is worth recalling that the present invention is described below according to different embodiments and is not limited thereto. The present invention can be implemented in various versions, known to the person skilled in the field, which are also included in the present invention.

Figure 1:
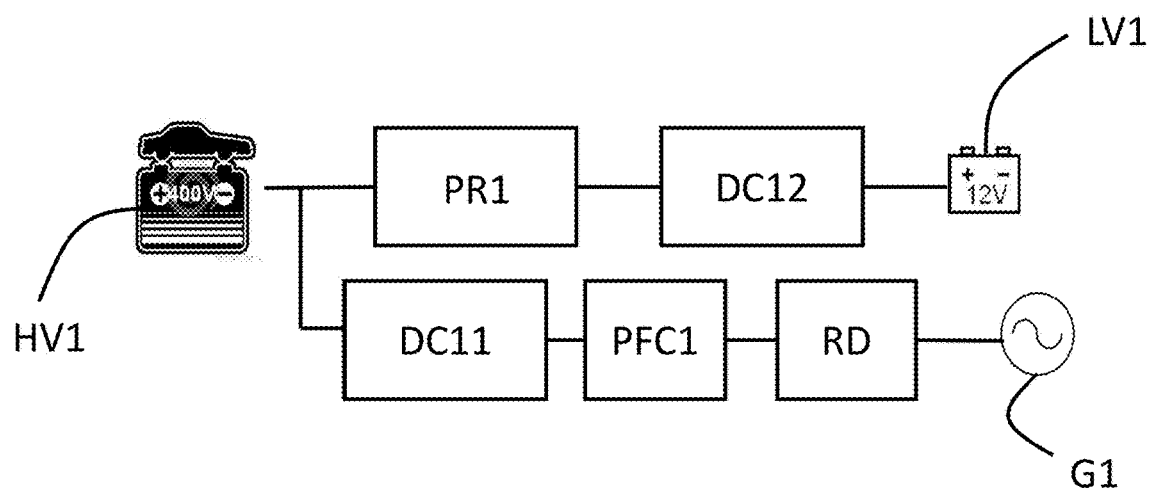
FIG. 1, functional block diagram of an OBC system according to the state of the art.

FIG. 1 shows a functional block diagram of an OBC system according to the state of the art. This OBC system powers a high voltage battery HV1, typically used for the propulsion of an electric or hybrid vehicle, and a low voltage battery LV1, used to power the electrical installations of said vehicle.

In reference to FIG. 1, for the purpose of powering the high voltage electrical system of the vehicle, used to charge the high voltage battery HV1, the represented OBC system features an AC-to-DC converter, which includes a rectifier RD that is powered by an external alternating electricity grid G1, such as a domestic alternating electricity grid, whereby said rectifier RD delivers a rectified voltage to the voltage converter serving as a PFC converter (PFC1 in FIG. 1) to regulate said voltage before powering high voltage battery HV1 through a galvanically-isolated DC-to-DC converter (DC11 in FIG. 1).

Still in reference to FIG. 1, for the purpose of powering the low voltage electrical system of the vehicle, used to charge the low voltage battery LV1, the represented OBC system features a pre-regulator PR1 connected to the high voltage battery HV1, whereby the voltage delivered by the pre-regulator PR1 from the voltage at the terminals of the HV1 battery is used to power the low voltage battery LV1 through a dedicated and galvanically-isolated auxiliary DC-to-DC converter (DC12 in FIG. 1).

Figure 2:
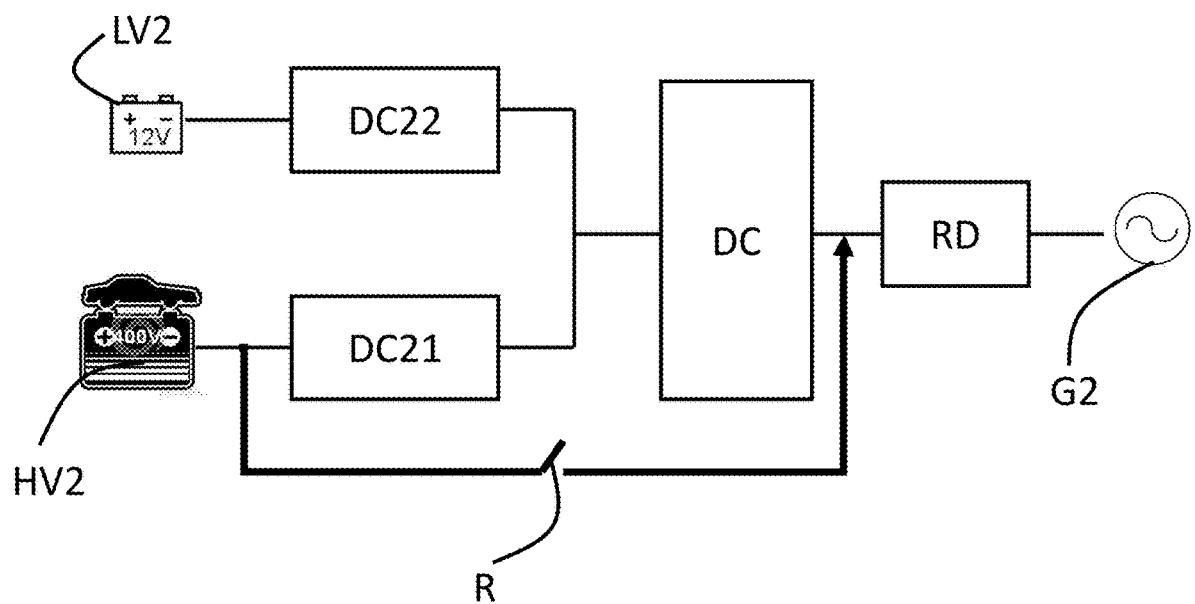
FIG. 2, functional block diagram of an OBC system according to the invention.

In reference to FIG. 2, for the purpose of improving the compactness of this design, the present invention proposes the shared use of the DC voltage converter, which serves as a PFC converter, both for an operating mode in which the high voltage battery HV2 is charging, and for an operating mode in which high voltage battery HV2 is not charging, and where it is able to provide voltage for the purpose of powering the low voltage battery LV2.

When the high voltage battery HV2 is charging, the DC voltage converter serves as a standard PFC converter, within a AC-to-DC converter, thereby regulating the voltage coming from the rectifier RD before it powers the high voltage HV2 battery through a galvanically-isolated DC-to-DC converter DC21.

When the high voltage battery HV2 is not charging, it contributes to charging the low voltage battery LV2. In this second operating mode, the DC voltage converter no longer serves as a PFC converter. The DC converter therefore serves as a pre-regulator for said low voltage battery LV2, whereby high voltage battery HV2 is not charging and the OBC system is not connected to the external alternating electricity grid G2. In this operating mode, the voltage at the terminals of the high voltage battery HV2 is connected to the input terminals of the DC converter through a set of switches R. Said DC converter delivers regulated voltage to the galvanically-isolated auxiliary DC-to-DC converter DC22 of the low voltage supply system, for the purpose of charging the low voltage battery LV2.

Serving as a pre-regulator, the DC converter converts the high voltage from the high voltage battery HV2 to regulated voltage used by the low voltage supply system, i.e. into voltage used to charge the low voltage battery LV2, through an auxiliary DC-to-DC converter converting high voltage supplied by the DC converter to lower voltage used by the low voltage supply system.

With the design of the OBC system according to the invention, there is no longer the need for a pre-regulator dedicated to charging the low voltage battery LV2, as the DC converter fulfils that function when the high voltage battery is not charging.

Therefore, in the operating mode in which the OBC system is connected to the external alternating electricity grid G2 for the purpose of charging the high voltage battery HV2, the DC converter is controlled so as to deliver high voltage, which is determined to optimise the charging of the high voltage battery HV2.

In the operating mode in which the OBC system—generally disconnected from the external alternating electricity grid G2, as the high voltage battery HV2 is not charging—charges the low voltage battery LV2, and the DC converter is controlled so as to deliver voltage to the auxiliary DC-to-DC converter DC22 connected to the low voltage battery LV2. The input of the DC converter receives the voltage delivered at the terminals of the high voltage battery HV2 and regulates said voltage based on the voltage demand determined for the low voltage battery LV2.

It should be noted that, according to two embodiments, the DC converter is of the boost type, or of the buck-boost type. The "boost" converter is a converter that forms part of a switched-mode power supply that raises the voltage, whereas the "buck-boost" converter is part of switched-mode power supply that can raise or lower the voltage.

Figure 3:
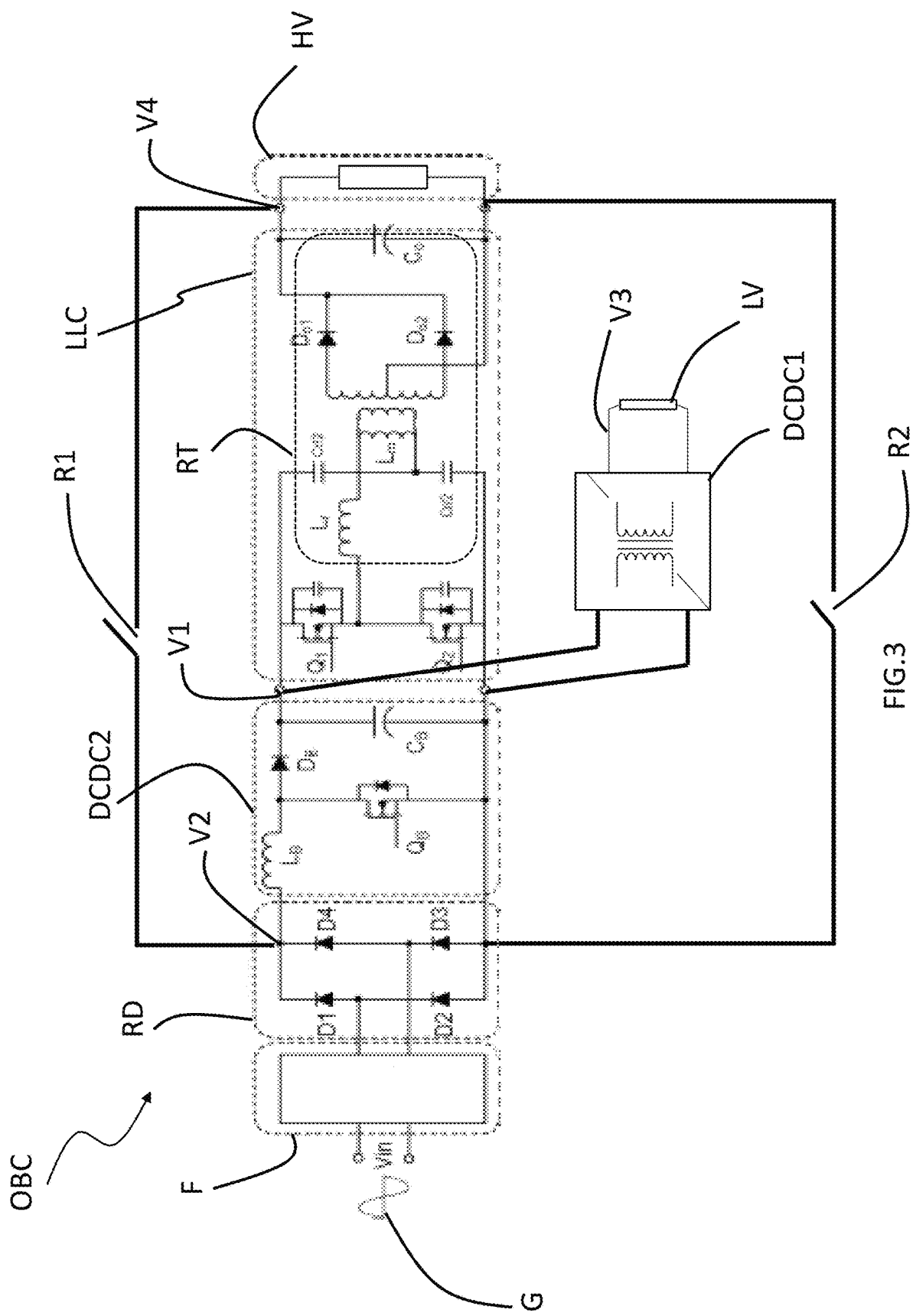
FIG. 3, simplified electronic diagram of a first embodiment example of an OBC system according to the present invention.

FIG. 3 shows a simplified electric diagram of an embodiment example of an OBC system according to the invention. As is well known, the OBC system is represented as a succession of stages. First, said OBC system includes a rectifier RD formed by diodes D1, D2, D3, D4. Then, the DC-to-DC converter DCDC2 includes an inductance LB, a switch QB, a diode DB and a capacitor CB between its output terminals. The isolated DC-to-DC converter LLC features two switches Q1, Q2, a resonant circuit RT that includes the inductance Lr, the two capacitors Cr/2, the inductance Lm, the two diodes Do1 and Do1 and a capacitor Co between its output terminals. The OBC system, according to the invention, is configured to charge the high voltage battery HV and the low voltage battery LV.

The low voltage battery LV is charged through an auxiliary DC-to-DC converter DCDC1 that includes, preferentially, the switches (not shown) used to adapt the voltage before it can be applied to the terminals of the low voltage battery LV. Preferentially, the auxiliary DC-to-DC converter DCDC1 is galvanically isolated.

From a structural point of view, two switches R1 and R2, and more specifically two relays, are added and connected, in the embodiment shown in FIG. 3, between the respective terminals of the high voltage battery HV and the input of the converter DCDC2.

With these switches R1 and R2, the voltage at the terminals of the high voltage battery HV is applied at the interface terminals located between the rectifier RD and the converter DCDC2, whereby said switches are closed, when the charge function of the high voltage battery HV is not implemented.

Figure 4:
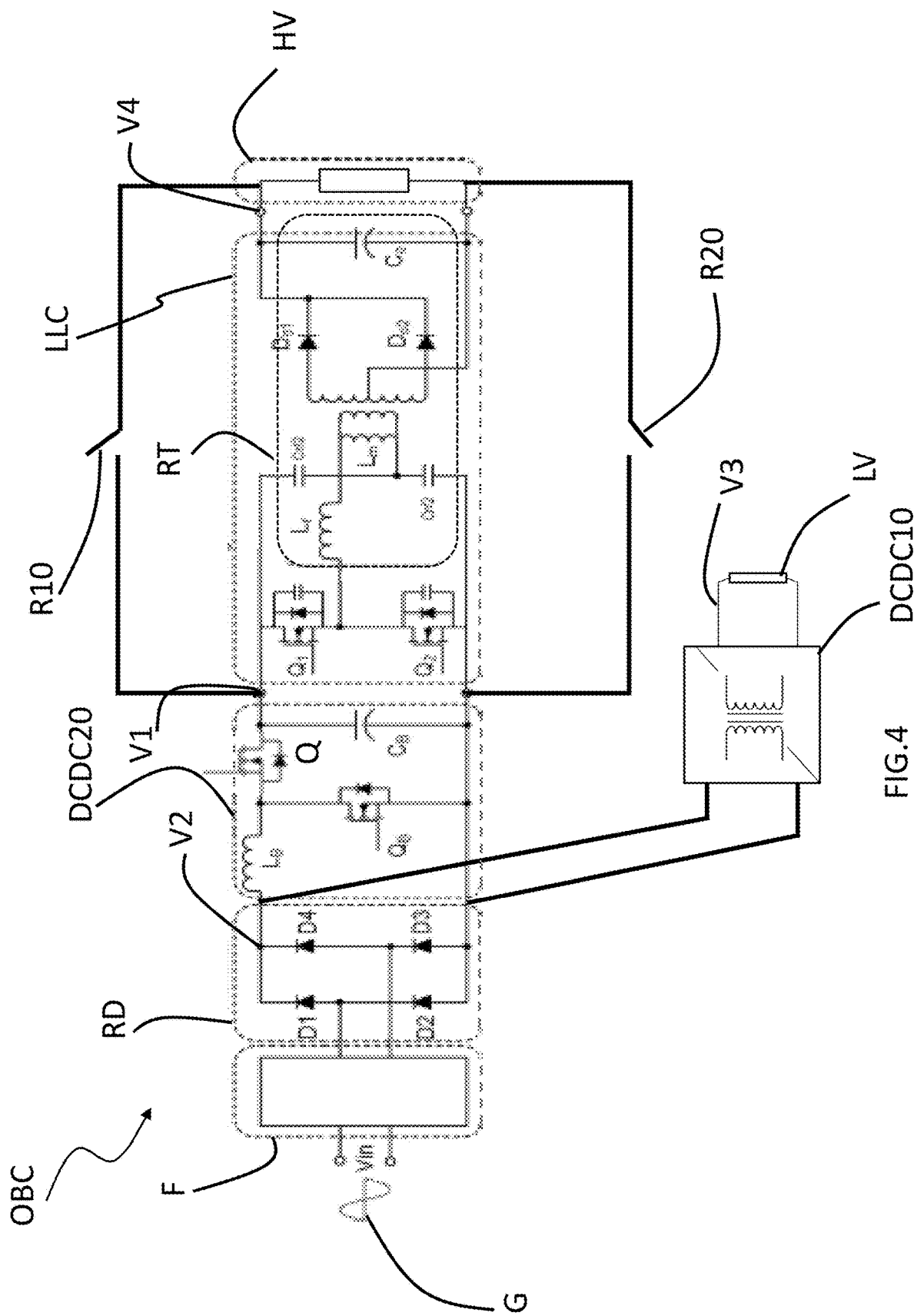
FIG. 4, simplified electronic diagram of a second embodiment example of an OBC system according to the present invention.

In FIG. 3, as in FIG. 4, V2 describes the input voltage arriving at the interface terminals located between the rectifier RD and the converter DCDC2, V1 is the first high voltage at the interface terminals located between converter DCDC2 and the isolated DC-to-DC converter LLC, V3 is the second low voltage at the terminals of the low voltage battery and V4 is the third high voltage at the terminals of the high voltage battery HV.

Therefore, in reference to FIG. 3, in a first operating mode, charging of the high voltage battery HV is active, as the OBC system is connected to the external alternating electricity grid G that delivers a sinusoidal voltage Vin. The voltage Vin supplied by the external alternating electricity grid G is filtered through filtering means F and rectified by a rectifier RD to deliver an input voltage V2 between said rectifier and converter DCDC2.

In a first operating mode, the converter DCDC2 serves as a PFC converter. At the output of converter DCDC2, the first high voltage V1 is regulated and constant, with a value ranging from 100 V and 900 V, and typically of around 500 V, depending on the third high voltage V4 required at the terminals of the high voltage battery HV. The first high voltage V1 is then adapted by an isolated DC-to-DC converter LLC to charge the high voltage battery HV. In this particular case, the DC-to-DC converter implemented to adapt the first high voltage V1 for the charging of the high voltage battery HV with voltage V4 consists of a LLC resonant half-bridge that includes a resonant circuit RT. This description is provided as an example and the isolated DC-to-DC converter LLC could very well follow a different topology.

In this first operating mode, the relays R1 and R2 are open. The input of the auxiliary DC-to-DC converter DCDC1, connected to the low voltage battery LV, corresponds to the first constant high voltage V1 supplied by the DCDC2 converter. In another version, the auxiliary DC-to-DC converter DCDC1 converts the first high voltage V1 into a second low voltage V3 of approximately 12 V, 24 V or, typically, of 48 V, depending on the conversion factor applied by said auxiliary DC-to-DC converter DCDC1.

In this version, the low voltage battery LV is charged in "downgraded" mode, as it does not have a dedicated regulator. The converter DCDC2 is controlled so as to regulate the first high voltage V1 that it delivers based on the voltage demand of said high voltage battery HV, and the second low voltage V3 supplied to the low voltage battery LV is not optimally adapted. This "downgraded" mode of powering the low voltage battery LV is considered to be acceptable in this version, in which the high voltage battery LV is charging.

The "downgraded" mode, in the first operating mode, is nonetheless acceptable, as mentioned above, because, as the high voltage battery HV is charging and the vehicle is connected to the external alternating electricity grid G, the demand in electrical power by the installations connected to the low voltage electrical system, such as the multimedia system, the window lift motors, etc. is, in practice, reduced to a minimum.

In a second operating mode, charging of the high voltage battery HV is not active, as the OBC system is disconnected from the external alternating electricity grid G.

In this case, relays R1 and R2 are closed and the interface terminals located between the rectifier RD and the converter DCDC2 are connected to the terminals of the high voltage battery HV, so that V2=V4.

In one embodiment, the DCDC2 converter can serve, according to the second operating mode, as a pre-regulator, the purpose of which is to deliver a first regulated variable voltage V1 adapted to the voltage demand determined at the terminals of the low voltage battery LV. In this case, the auxiliary DC-to-DC converter includes switches (not shown). Said switches, working together with the switch(es) QB of the converter DCDC2 are configured, in this embodiment, to control the electric power delivered respectively to each said converter.

In one embodiment, calculation means is included to determine said voltage demand of low voltage battery LV.

In practice, the input of the auxiliary DC-to-DC converter corresponds to the first high voltage V1 delivered by the DCDC2 converter. The auxiliary DC-to-DC converter adapts said first high voltage V1 based on the voltage demand of the low voltage battery LV so as to deliver the required second low voltage V3. The auxiliary DC-to-DC converter DCDC1 therefore delivers the second low voltage V3, as determined by its conversion factor, at the terminals of the low voltage battery LV.

In another version of the second operating mode, provided as an example and not limited thereto, the switches of the auxiliary DC-to-DC converter DCDC1 work on a constant duty cycle, and the switches QB of converter DCDC2 work on a variable duty cycle, so as to control the voltage supplied by the auxiliary DC-to-DC converter DCDC1 to the low voltage battery LV. The auxiliary DC-to-DC converter DCDC1 can therefore feature a constant conversion factor between the input voltage, i.e. the first voltage V1 output from the DC-to-DC auxiliary converter, and the second delivered low voltage V3, so as to operate on 50% of its capacity in terms of duty ratio, and to achieve a very low voltage output. To adapt the second low voltage V3 to the demand of the low voltage battery LV, the auxiliary DC-to-DC converter DCDC1 can, as an alternative, feature a variable conversion factor, but this configuration would cause a substantial increase of voltage loss.

FIG. 4 shows a simplified electric diagram of a second embodiment example of an OBC system according to the invention.

Compared with the example given in FIG. 3, the auxiliary DC-to-DC converter DCDC10 and switches R10, R20, typically consisting of relays, are connected in reverse. In other words, in FIG. 4 the auxiliary DC-to-DC converter DCDC10 is connected to the connection terminals to which relays R1 and R2 are, respectively, connected in FIG. 3, and reciprocally, relays R10 and R20 are connected, in FIG. 4, to the connection terminals to which the auxiliary DC-to-DC converter DCDC1 is connected in FIG. 3.

Therefore, the auxiliary DC-to-DC converter DCDC10 is connected to the respective terminals of the low voltage battery LV and of the input of the DC-to-DC converter DCDC20.

Relays R10, R20 are connected to the respective terminals of the high voltage battery HV and to the output of DCDC20 converter that corresponds to the input of the isolated DC-to-DC converter LLC.

Furthermore, the diode DB in FIG. 3 is replaced, in FIG. 4, with a two-way switch Q, which can even be of the same type as the switch QB.

When the OBC system is connected to the external electricity grid G, and the charge function of the high voltage battery HV is implemented, the input voltage V2 is delivered to the DCDC20 converter and corresponds to the rectified voltage Vin coming from the external electricity grid. Charging of the high voltage battery HV, through the converter DCDC20, serving as a PFC converter, and the isolated DC-to-DC converter LLC, and potentially charging of the low voltage battery LV in "downgraded" mode, through the auxiliary DC-to-DC converter DCDC10, are directly effective.

When the charging function of the high voltage battery HV is not implemented, with the R10 and R20 switches closed, the third high voltage V4 at the terminals of the high voltage battery HV is applied to the interface terminals located between the converter DCDC20 and the isolated DC-to-DC converter LLC, so that V1=V4. Furthermore, the two-way switch Q is operated by switching with the switch QB, so as to allow the current to travel from the interface terminals located between the converter DCDC20 and the isolated DC-to-DC converter LLC to the interface terminals located between the rectifier RD and the converter DCDC20. In this case, the converter DCDC20 operates in buck mode.

The third high voltage V4 at the terminals of the high voltage battery HV is therefore routed through the converter DCDC20 to the interface terminals located between the rectifier RD and the converter DCDC20, and corresponds to the input voltage V2, whereby the auxiliary DC-to-DC converter DCDC10 that powers the low voltage battery LV is connected to the same terminals. In one embodiment, the converter DCDC20 lowers the voltage delivered by the high voltage battery HV so that V2<V4. In one embodiment, the converter DCDC20 also serves a pre-regulator delivering stable voltage to the converter DCDC10 that supplies the second low voltage V3 to power the low voltage battery LV. In other words, the converter DCDC20 operates on a variable duty cycle, whereas the auxiliary DC-to-DC converter DCDC10 works on a constant duty cycle, of 50% for example.

Therefore, as in the example in FIG. 3, the low voltage battery LV is charged with the voltage supplied by the high voltage battery HV.

For the implementation of the present invention, it should be noted that the DC converter can be of the "boost" type or of the "buck-boost" type, that it can be a single-cell converter or a multiple-cell converter, that it can be interleaved or not, and that it can be reversible or not. In the case of the second embodiment, the converted DCDC20 is, in practice, of the "buck-boost" type. In particular, the DC converter is not isolated.

In particular, isolated converters may be different from the ones described above. For example, in an isolated converter, the primary and/or secondary circuit(s) could each include several coils. In particular, isolated converters can be similar to those described in patent application PCT/EP2016/074641.

The invention claimed is:

1. An electrical system, in particular designed to be installed on board an electric or hybrid vehicle, whereby said electrical system includes:
   an AC-to-DC converter that includes a rectifier and a DC-to-DC converter,
   an isolated DC-to-DC converter connected to a high voltage battery, and
   whereby said electrical system is configured, in a first operating mode, to be connected to an external alternating electricity grid to charge the high voltage battery, and whereby said rectifier supplies a rectified voltage to the DC-to-DC converter, from the alternating current received from the external alternating electricity grid, and whereby said DC-to-DC converter is connected to the high voltage battery through the isolated DC-to-DC converter
   said electrical system is wherein:
   the first interface terminals of the DC-to-DC converter are designed to be connected to a low voltage battery, and in that
   said electrical system is configured so that, in a second operating mode, when the electrical system is disconnected from the external alternating electricity grid, said DC-to-DC converter supplies an initial voltage from the high voltage battery to power the low voltage battery.

2. The electrical system according to claim 1 and including
   an auxiliary DC-to-DC converter connected to the low voltage battery, and featuring one input connected to the first interface terminals of the DC-to-DC converter, and
   where said electrical system is configured so that, in a second operating mode, said DC-to-DC converter provides the auxiliary DC-to-DC converter with the initial voltage from the high voltage battery for the purpose of powering the low voltage battery.

3. The electrical system according to claim 2 in which the DC-to-DC converter and the auxiliary DC-to-DC converter respectively include switches configured to control the electrical power supplied respectively by said DC-to-DC converter and by said auxiliary DC-to-DC converter,
   in which, in a second operating mode, the switches of the auxiliary DC-to-DC converter work on a constant duty cycle, and the switches of the DC-to-DC converter work on a variable duty cycle, so as to control the voltage supplied by the auxiliary DC-to-DC converter to the low voltage battery LV.

4. The electrical system according to claim 1, in which the electrical system includes a first switch connected between a high input terminal of the high voltage battery and a second high interface terminal of the DC-to-DC converter, and a second switch connected between a low input terminal of the low voltage battery and a low second interface terminal of the DC-to-DC converter, and said electrical system is configured so that, in the second operating mode, the first and second switches are closed, thereby ensuring that a third voltage, at the terminals of the high voltage battery, is imposed on the second interface terminals of the DC-to-DC converter.

5. The electrical system according to claim 4, in which the first interface terminals of the DC-to-DC converter correspond to the terminals connected at the input of the isolated DC-to-DC converter, and the second interface terminals of the DC-to-DC converter correspond to the terminals connected at the output of the rectifier.

6. The electrical system according to claim 5, in which, according to a first operating mode, the auxiliary DC-to-DC converter is also configured to convert the voltage supplied by the DC-to-DC converter from the external alternating electricity grid to a voltage that can be used to power the low voltage battery.

7. The electrical system according to claim 4, in which the first interface terminals of the DC-to-DC converter correspond to the terminals connected at the output of the rectifier, and the second interface terminals of the DC-to-DC converter correspond to the terminals connected at the input of the isolated DC-to-DC converter.

8. The electrical system according to claim 4, in which according to a first operating mode, the first and second switches are open, so as to enable the DC-to-DC converter to provide voltage to the high voltage battery through said isolated DC-to-DC converter.

9. The electrical system according to claim 5 in which the first and second switches are electromechanical relays or semiconductor switches.

10. Electrical system according to claim 1, in which the DC-to-DC converter is of the boost type or of the buck-boost type.

* * * * *